US012037437B2

(12) United States Patent
Weydert et al.

(10) Patent No.: US 12,037,437 B2
(45) Date of Patent: *Jul. 16, 2024

(54) RUBBER COMPOSITION COMPRISING A BLOCK-COPOLYMER

(71) Applicants: THE GOODYEAR TIRE & RUBBER COMPANY, Akron, OH (US); LUXEMBOURG INSTITUTE OF SCIENCE AND TECHNOLOGY, Esch-sur-Alzette (LU)

(72) Inventors: Marc Weydert, Bertrange (LU); Alexander Shaplov, Esch-sur-Alzette (LU); Abdullah Gunaydin, Esch-sur-Alzette (LU); Clément Mugemana, Esch-sur-Alzette (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/656,097

(22) Filed: Mar. 23, 2022

(65) Prior Publication Data

US 2022/0380510 A1    Dec. 1, 2022

Related U.S. Application Data

(60) Provisional application No. 63/194,510, filed on May 28, 2021.

(51) Int. Cl.
*C08F 293/00*    (2006.01)
*C08L 9/06*    (2006.01)

(52) U.S. Cl.
CPC .............. *C08F 293/00* (2013.01); *C08L 9/06* (2013.01)

(58) Field of Classification Search
CPC ... B60C 1/0016; B60C 1/0025; B60C 1/0041; B60C 2001/0058; B60C 2001/0066; C08F 293/00; C08L 9/06
See application file for complete search history.

(56) References Cited

U.S. PATENT DOCUMENTS

| | | | |
|---|---|---|---|
| 8,759,451 B2 | 6/2014 | Mruk et al. | |
| 2013/0005894 A1 | 1/2013 | Lopitaux et al. | |
| 2014/0088224 A1 | 3/2014 | Sandstrom et al. | |
| 2014/0299249 A1 | 10/2014 | Custodero et al. | |
| 2014/0343190 A1 | 11/2014 | Custodero et al. | |
| 2014/0343216 A1 | 11/2014 | Custodero et al. | |
| 2017/0210887 A1* | 7/2017 | Vasseur ................... | C08K 3/22 |
| 2021/0163721 A1 | 6/2021 | Weydert et al. | |

FOREIGN PATENT DOCUMENTS

EP    0942018 A1    9/1999

OTHER PUBLICATIONS

Ishizone et al., Synthesis of polymers carrying adamantly substituents in side chain, Polymer Journal 2018 vol. 50, pp. 805-819 (Year: 2018).*
Fuchise et al., Precise synthesis of poly(1-adamantyl methacrylate) by atom transfer radical polymerization, Polymer Journal, 40, 2010 pp. 626-631 (Year: 2010).*
European Search Report for Serial No. EP22176051 mailed Nov. 17, 2022.
Chinese Office Action for Application No. 202210588661.5, dated Nov. 22, 2023.

* cited by examiner

*Primary Examiner* — Robert D Harlan
(74) *Attorney, Agent, or Firm* — Mandy B. Willis

(57) ABSTRACT

The present invention is directed to a rubber composition comprising an elastomer, a filler, and a block-copolymer. According to the invention, the block-copolymer comprises (i) an elastomer block and (ii) a thermoplastic block comprising a poly alkylacrylate, wherein the alkylacrylate comprises a polycyclic substituent at its single bonded oxygen atom. Moreover, the present invention is directed to a block-copolymer.

20 Claims, 1 Drawing Sheet

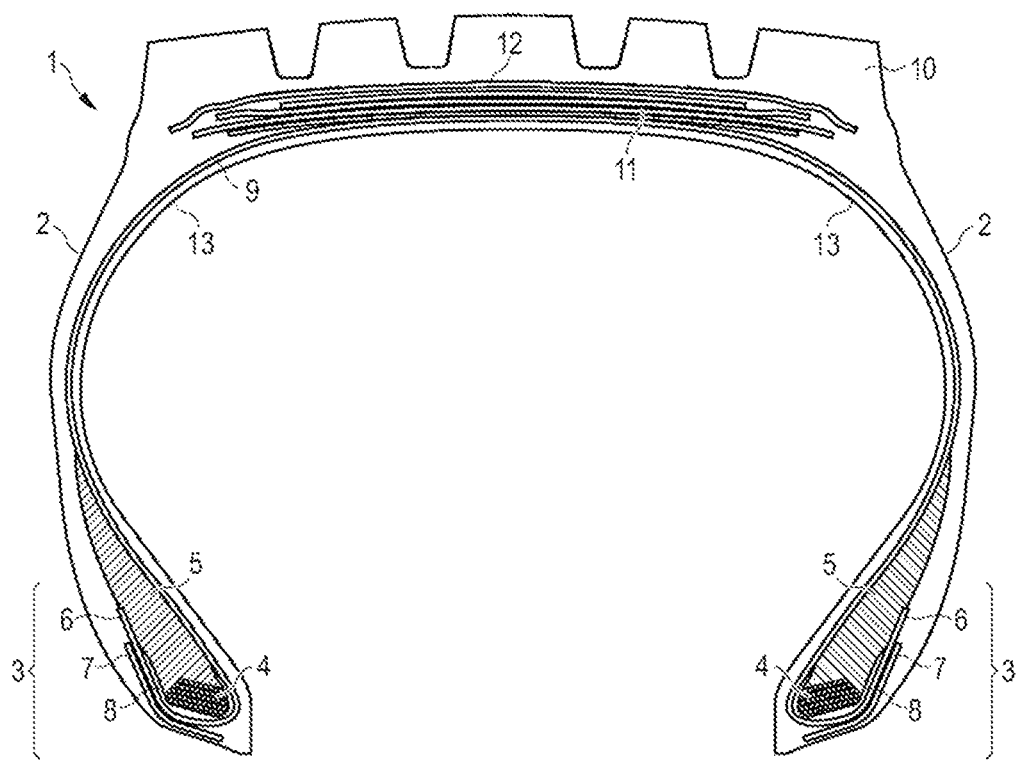

RUBBER COMPOSITION COMPRISING A BLOCK-COPOLYMER

FIELD OF THE INVENTION

The present invention is directed to a rubber composition, in particular a sulfur-vulcanizable or sulfur-vulcanized rubber composition, comprising a block-copolymer. Moreover, the present invention is directed to rubber products, such as tires or tire components, comprising the rubber composition.

BACKGROUND OF THE INVENTION

Rubber compositions, in particular for tires but not limited to such an application, need to meet a plurality of requirements such as durability, stiffness, elasticity, low hysteresis and many more. In order to further improve the properties of rubber compositions for some applications, the use of ultra-high molecular weight polyethylene (UHMWPE) has been suggested in the past. However, while the use of polyethylene material has helped in some applications to improve rubber properties, such as stiffness, its use also has some inherent disadvantages. For instance, one issue is its relatively low melting point on the order of 135° C. which can be problematic in many rubber compositions. Another downside associated with compounding polyethylene into rubber formulations is that it is difficult to process and disperse in rubber formulations, thereby limiting the desired reinforcement effects due to relatively poor dispersion. Moreover, stiffness can also be improved by provision of suitable organic or inorganic filler materials. Nevertheless, increasing the amount of such fillers to higher levels may also have multiple disadvantages such as an increase of weight, problems during mixing and others. While there have been many approaches for providing rubber compositions with high stiffness, significant room for improvement is left.

SUMMARY OF THE INVENTION

A first object of the invention may be to provide advanced reinforced rubber compositions and materials therefore, in particular for tire components.

Another object of the invention may be to provide a rubber composition having high stiffness with limited hysteresis and/or weight.

Another object of the invention may be to achieve small phase sizes compared to blending of conventional thermoplastic materials, such as UHMWPE.

The present invention is defined by the independent claim. Further preferred embodiments are mentioned in the dependent claims or are described in the summary of the invention and the description herein below.

In one aspect of the invention, a rubber composition is provided, the rubber composition comprising an elastomer, a filler and a block-copolymer. According to the invention, the block-copolymer has an elastomer block and a thermoplastic block comprising a poly alkylacrylate, wherein the alkylacrylate comprises a polycyclic substituent at its single bonded oxygen atom.

It has been found by the inventors that the provision of said block-copolymer material reduces phase sizes in the rubber composition, in particular in comparison with other conventional thermoplastic reinforcements, such as UHMWPE. Having an elastomer block, the block-copolymer is compatible to other elastomers in the rubber composition. Also, according to a non-binding theory of the inventors, the poly alkylacrylate which is (covalently) bonded, or in other words connected to the elastomer block, connects to other ingredients of the rubber composition such as the filler. Moreover, the provision of the poly alkylacrylate reinforces the rubber compound, wherein its substituents limit significantly the chain mobility within the rubber compound. Overall, the block-copolymer helps to provide reinforcement, in particular at lower weight, or density respectively, than conventional filler materials. These block-copolymers also have fewer disadvantages than other thermoplastic reinforcement materials, such as the above mentioned UHMWPE, with regard to thermal stability at high temperatures.

In one embodiment, the elastomer and/or the elastomer block comprises or consists of at least one diene-based elastomer. For instance, the diene-based elastomer is selected from one or more of styrene butadiene rubber, polybutadiene, solution polymerized styrene butadiene rubber, emulsion polymerized styrene butadiene rubber, natural rubber, synthetic polyisoprene rubber, and isoprene-butadiene rubber. The diene-based elastomer may be based on monomer residues such as one or more of butadiene, styrene and isoprene. Provision of such an elastomer block helps to improve compatibility with other rubbers or diene-based elastomers in the rubber composition.

In another embodiment, the block-copolymer has exactly, or in other words only, two blocks, i.e. the elastomer block and the thermoplastic block. In yet other words, the block copolymer is a diblock copolymer.

In another embodiment, the elastomer or elastomer block has a functional group for the coupling to the surface of one of silica and carbon black. Such groups can for instance be chosen from one or more of amino silane, amino siloxane, mercapto silane, mercapto siloxane, silanol, alkoxy silane, alkoxy thiol, epoxy, and hydroxy, in particular for the coupling to silica. Such groups even further improve the bonding and/or reinforcement in the rubber composition, in particular to a silica comprising filler network.

In another embodiment, the elastomer block comprises an elastomer chain having a first chain end and a second chain end, with the first chain end being connected to the poly alkylacrylate block, wherein said functional group is located at the second chain end.

In still another embodiment, said functional group is located at the chain end of the elastomer block which is not connected to the thermoplastic block.

In still another embodiment, the poly alkylacrylate has the following structure:

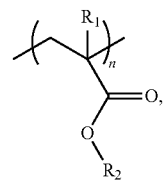

with n being the number of the alkylacrylate monomers in the poly alkylacrylate (or monomer residues respectively); $R_1$ being 0 or the alkyl; and $R_2$ being a polycyclic hydrocarbon material. Optionally, n is an integer larger than 10, preferably larger than 50, and preferably smaller than 2000, preferably smaller than 1500.

Such materials have been found to be even more desirable because of the bulky substituent $R_2$ which may for instance further help to improve stiffness of the compound. Moreover, the poly alkylacrylate with its bulky side groups/substituents helps to enhance processability (also due to its amorphous nature) and has also a relatively high heat resistance, or in other words, a relatively high thermal transition point.

In general, the suggested block-copolymers may provide an advanced reinforcement of the rubber matrix with limited hysteresis. Also, the suggested alkylacrylates are relatively light weight materials compared to silica or carbon black when considering achieving a similar degree of reinforcement. In particular, such properties, or a combination thereof, may not be easily achieved by the provision of more carbon black or silica in the rubber composition. Adding more of such materials may increase weight, or density respectively, and/or hysteresis. Moreover, it could make mixing more difficult or change also other properties of the compound in an undesired manner.

In still another embodiment the alkyl is an ethyl group (—$CH_3$) or an ethyl group (—$C_2H_5$).

In yet another embodiment, the alkylacrylate has at its single bonded oxygen atom one of a bicyclic substituent and a tricyclic substituent.

In still another embodiment, the alkylacrylate has at its single bonded oxygen atom a hydrocarbon substituent comprising at least seven carbon atoms, with at least five of the carbon atoms cyclically arranged.

In still another embodiment, the alkylacrylate has a hydrocarbon substituent comprising at least seven carbon atoms, optionally at least eight carbon atoms, with at least five (optionally at least six) of the carbon atoms cyclically arranged. These have turned out to be desirable materials.

In another embodiment, the poly alkylacrylate is one of poly(isobornyl methacrylate) (also referred to herein as PIBOMA) and poly(adamantyl methacrylate) (also referred to herein as PADAM). These materials have been identified by the inventors as two materials with most desirable properties for one of the blocks of the copolymer, in particular in terms of reinforcement. Moreover, the bulky side groups or substituents help to enhance processability and provide a relatively high glass transition temperature which may be an indicator for the heat resistance of the material in the vulcanized compound.

In still another embodiment, the poly alkylacrylate comprises one or more of the following structures:
(with n being an integer, preferably equal to and/or greater than 3, or even more preferably greater than 10):

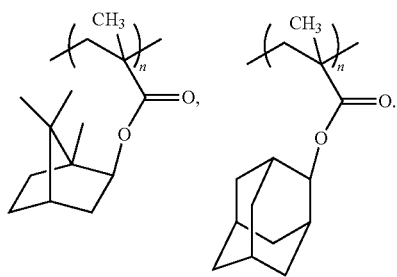

In still another embodiment, the thermoplastic (polymer) block consists of the poly alkylacrylate and has one or more of: i) a number average molecular weight Mn of at least 10,000 g/mol, optionally at least 15,000 or 20,000 g/mol; and ii) at least 10, preferably at least 50, monomers (or monomer residues) of said alkylacrylate. It has been discovered that such a minimum weight may be desirable to observe a greater effect in reinforcement and avoid a too low thermal transition point. Mn and/or Mw (weight average molecular weight) is determined herein by GPC according to ASTM standard D5296, in particular using polystyrene calibration standards.

In yet another embodiment, the thermoplastic (polymer) block consists of the poly alkylacrylate and has one or more of: (i) a number average molecular weight Mn of at most 450,000 g/mol, preferably at most 150,000 g/mol, or yet more preferably at most 100,000 g/mol, or even more preferably 90,000 g/mol; and (ii) at most 6000, preferably at most 2000, yet preferably at most 1500, or even more preferably at most 500 or at most 400 monomer residues of said alkyl acrylate.

In still another embodiment, the elastomer block, or in other words the elastomer chain, has one or more of: (i) a number average molecular weight Mn of at least 10,000 g/mol, preferably at least 20,000 g/mol, or yet more preferably at least 50,000 g/mol; and (ii) at least 90, or preferably at least 300, monomers chosen from a list of styrene, butadiene, and isoprene.

In still another embodiment, the elastomer block, or in other words elastomer chain, has one or more of: (i) a number average molecular weight Mn of at most 150,000 g/mol, preferably at most 120,000 g/mol; and (ii) at most 2500, or preferably at most 2000, or even more preferably at most 1500 monomers chosen from a list of styrene, butadiene, and isoprene.

In still another embodiment, the number average molecular weight ratio of the elastomer block and the thermoplastic block is ranging from 0.5 to 3, preferably from 0.5 to 2.5.

In still another embodiment, the number average molecular weight ratio of the elastomer block and the thermoplastic block is within a range of 0.1 to 1, preferably 0.1 to 0.95, and even more preferably 0.25 to 0.8, or yet more preferably within a range of 0.25 and 0.5. In other words, the weight of the elastomer block is relatively small compared to the weight of the thermoplastic block. This allows use of the block-copolymer in a flexible manner in different types of rubber compositions. In particular, it adds a limited weight or amount of elastomer material to the composition, with regards to the specific properties of the elastomer block.

In still another embodiment, the block-copolymer has a polydispersity index (Mw/Mn) within a range of 1.03 to 3, preferably within a range of 1.05 to 2, and even more preferably within a range of 1.05 to 1.6.

In yet another embodiment, the block-copolymer has a first glass transition temperature within a range of −92° C. to −15° C. and a second glass transition temperature within a range of 150° C. to 250° C. The glass transition temperature is determined under ASTM E1545-11(2016), by TMA, with a heating rate of 5° C. per minute, measuring inflection point.

In yet another embodiment, the block-copolymer has a number average molecular weight of at least 20,000 g/mol, preferably at least 30,000 g/mol and/or at most 300,000 g/mol, preferably at most 200,000 g/mol.

In still another embodiment, the rubber composition comprises 10 phr to 95 phr of the elastomer, preferably a diene-based elastomer; 5 phr to 90 phr of the block-copolymer; and 20 phr to 200 phr of the filler comprising one or more of at least one silica and at least one carbon black. Thus, the elastomer block (only) of the block-copolymer is considered herein as part of the total 100 parts of rubber/elastomer by weight.

In another embodiment, the filler comprises predominantly silica, and optionally a silane coupling agent.

In an alternative embodiment, the rubber composition comprises 100 phr of the elastomer; 5 phr to 90 phr (preferably 10 phr to 50 phr) of the block-copolymer; and 20 phr to 200 phr of the filler comprising one or more of at least one silica and at least one carbon black (wherein the block-copolymer and/or its elastomer block is not counted as part of the 100 parts of rubber/elastomer by weight).

In another embodiment, the rubber composition comprises 10 phr to 50 phr of the block-copolymer; and 50 phr to 90 phr of the elastomer.

The rubber composition may include at least one and/or at least one additional diene-based rubber. Representative synthetic polymers are the homopolymerization products of butadiene and its homologues and derivatives, for example methylbutadiene, dimethylbutadiene and pentadiene as well as copolymers such as those formed from butadiene or its homologues or derivatives with other unsaturated monomers. Among the latter are acetylenes, for example vinyl acetylene, olefins, for example isobutylene, which copolymerizes with isoprene to form butyl rubber; vinyl compounds, for example acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect, the elastomer is preferably of at least two of diene-based elastomers. For example, a combination of two or more elastomers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In an embodiment, an emulsion polymerization derived styrene/butadiene (ESBR) might be used having a relatively conventional styrene content of 20 to 28 percent bound styrene or, for some applications, an ESBR having a medium to relatively high bound styrene content, namely a bound styrene content of 30 to 45 percent. By emulsion polymerization prepared ESBR, it is meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer are also contemplated as diene-based rubbers for use in this invention.

In another embodiment, solution polymerization prepared SBR (SSBR) may be used. Such an SSBR may for instance have a bound styrene content in a range of 5 to 50, preferably 9 to 36, percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator.

The cis 1,4-polyisoprene and cis 1,4-polyisoprene natural rubber are well known to those having skill in the rubber art.

In one embodiment, cis 1,4-polybutadiene rubber (BR) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207, Budene® 1208, or Budene® 1223 from The Goodyear Tire & Rubber Company. Apart from Budene® 1223, these high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

In one embodiment, a synthetic or natural polyisoprene rubber can be used.

The term "phr" as used herein, and according to conventional practice, refers to "parts by weight of a respective material per 100 parts by weight of rubber, or elastomer." In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 to 10 phr, optionally from 1 to 5 phr, of one or more additional diene-based rubbers, such as SBR, SSBR, ESBR, PBD/BR, NR and/or synthetic polyisoprene. In another example, the composition may include less than 5, preferably less than 3, phr of an additional diene-based rubber or be also essentially free of such an additional diene-based rubber. The terms "compound" and "composition" may be used herein interchangeably, unless indicated otherwise.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis &

Testing of Petroleum and Related Products and British Standard 2000 Parts, 2003, 62nd edition, published by the Institute of Petroleum, United Kingdom.

In another embodiment, the rubber composition comprises from 40 phr to 160 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g. sodium silicate. Such conventional silicas might be characterized, for example, by having a BET surface area as measured using nitrogen gas. In one embodiment, the BET surface area may be in the range of 40 to 600 square meters per gram. In another embodiment, the BET surface area may be in a range of 80 to 300 square meters per gram. The BET method of measuring surface area is described in the Journal of the American Chemical Society, Volume 60, Page 304 (1930). The conventional silica may also be characterized by having a dibutylphthalate (DBP) absorption value in a range of 100 to 400, alternatively 150 to 300. The conventional silica might be expected to have an average ultimate particle size, for example in the range of 0.01 to 0.05 micron as determined by the electron microscope, although the silica particles may be even smaller, or possibly larger, in size. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc. and silicas available from Evonik AG with, for example, designations VN2 and Ultrasil 6000GR, 9100GR, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition in addition, including, but not limited to, particulate fillers including ultra-high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment, the rubber composition may contain a conventional sulfur containing organosilicon compound. Examples of suitable sulfur containing organosilicon compounds are of the formula:

$$Z\text{-Alk-}S_n\text{-Alk-}Z \qquad \qquad I$$

in which Z is selected from the group consisting of

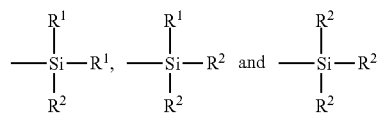

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

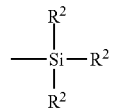

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in United States Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition (or in other words sulfur-vulcanizable rubber composition) would be compounded by methods generally known in the rubber compounding art, such as mixing the various sulfur-vulcanizable constituent rubbers with various commonly used additive materials such as, for example, sulfur donors, curing aids such as activators and retarders and processing additives, such as oils resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise 0.5 to 10 phr, usually 1 to 5 phr. Typical amounts of processing aids comprise 1 to 50 phr. Typical amounts of antioxidants comprise 1 to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise 1 to 5 phr. Typical amounts of fatty acids, if used, which can include stearic acid comprise 0.5 to 3 phr. Typical amounts of waxes comprise 1 to 5 phr. Often microcrystalline waxes are used. Typical amounts of peptizers comprise 0.1 to 1 phr. Typical peptizers may be, for example, pentachlorothiophenol and dibenzamidodiphenyl disulfide.

In another embodiment the composition comprises 5 phr to 80 phr of at least one resin, such as a traction resin. The resin may be chosen from one or more of styrene-alphamethylstyrene resins, coumarone-indene resins, petroleum resins, hydrocarbon resins, terpene polymers, terpene phenol resins, phenol resins, C5 resins, C9 resins, CPD resins, DCPD resins, rosin derived resins and copolymers thereof. Moreover, one or more of these resins may be hydrogenated.

Accelerators may be used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 to 10 or 0.5 to 4, alternatively 0.8 to 1.5, phr. In another embodiment, combinations of a primary and a secondary accelerator might be used with the secondary accelerator being used in smaller amounts, such as from 0.05 to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

In another aspect of the invention, an article of manufacture is provided which may preferably be selected from a tire, a power transmission belt, a hose, a track, an air sleeve, and a conveyor belt. The article comprises a rubber composition in accordance with one or more of the above embodiments or elements thereof.

In an embodiment, a tire comprises at least one component made of the rubber composition, wherein the component is at least one of: a carcass ply, a belt ply, an overlay ply, an apex, a sidewall, a tread, a chipper, a flipper, an inner liner, a chafer, a ply strip, a shoulder, an undertread, a tread cap and a tread base. In principle, the composition may be used in multiple of said tire components.

In another embodiment, said component is selected from at least one of: a carcass ply, a belt ply, an apex, a sidewall, a chipper, a flipper, a chafer and a shoulder. In other words, the rubber composition may be of particular interest in components requiring a high stiffness. The tread or parts thereof are not of interest in this specific embodiment.

The tire, in particular the pneumatic tire, may be a race tire, passenger tire, aircraft tire, agricultural tire, earthmover tire, off-the-road tire, truck tire, and the like. In one embodiment, the tire is a passenger or truck tire. The tire may also be a radial or bias tire.

Vulcanization of the rubber composition or the (pneumatic) tire may be generally carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In another aspect, the present invention is directed to the block-copolymer as such, as described in the above aspects and optionally in the corresponding embodiments. In one embodiment, the block copolymer is a diblock copolymer.

In yet another aspect, the present invention is directed to the use of the block-copolymer described herein in one or more of a rubber composition, a rubber component and a tire.

It is emphasized that one or more embodiments, or features thereof, may be be combined with each other within the scope of the present invention.

BRIEF DESCRIPTION OF THE DRAWING

The invention will be described by way of example and with reference to the accompanying drawings in which:

FIG. 1 illustrates a schematic cross section through an example tire.

DETAILED DESCRIPTION OF THE INVENTION

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. One or more of the carcass ply 9, belt plies 11, and overlay ply 12 may have a plurality of substantially parallel reinforcing members made of a fabric material such as polyester, rayon, or similar suitable organic polymeric compounds or made of metal wire. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10.

While the embodiment of FIG. 1 suggests a plurality of tire components including for instance apexes 5, chippers 7, flippers 8, and overlay 12, such components are all not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have, for instance, more or less than four grooves. It shall be emphasized that the present invention focuses on a rubber composition comprising a block-copolymer. Thus, the description of FIG. 1 and its components are merely to be understood as an example without limiting the present invention.

In an embodiment of the invention, a rubber composition, such as in a rubber component of the tire 1 comprises a solution-polymerized styrene butadiene rubber and a block-copolymer having an elastomer block and a poly (isobornyl methacrylate) block. In an alternative embodiment, the rubber composition may comprise one or more of polybutadiene, natural rubber, solution-polymerized styrene butadiene as an elastomer. Instead of a poly (isobornyl methacrylate) block, the block-copolymer can also comprise a poly (adamantyl methacrylate) block or a block comprising both thermoplastic materials, i.e. (isobornyl methacrylate) units and (adamantyl methacrylate) units within the thermoplastic block.

Such block-copolymers can be prepared by the person skilled in the art by free radical, ionic, coordination, reversible addition-fragmentation chain transfer (RAFT) or atom transfer radical (ATRP) polymerization, for example.

This invention is illustrated by the following examples that are merely for the purpose of illustration and are not to be regarded as limiting the scope of the invention or the manner in which it can be practiced. Unless specifically indicated otherwise, parts and percentages are given by weight.

In a non-limiting example, isobornyl methycrylate (IBOMA) can be polymerized to PIBOMA via RAFT polymerization using 1,1,2-trichleroethane (TCA) as a solvent at a temperature of 60° C., and by addition of 4-Cyano-4-[(dodecylsulfanylthiocarbonyl) sulfanyl]pentanoic acid (CDTPA) and α,α,'-Azoisobutyronitrile (AIBN), with an SDTPA:AIBN moler ratio of 4:1, wherein IBOMA is present at 1.44 g/ml or 50%, for a time of 24 hours. After having obtained the thermoplastic PIBOMA (block), styrene and butadiene monomers are added under addition of CDTPA and the initiator 2,2'-Azobis(N-butyl-2-methyl propionamide) (VAM-110) as well as 1,1,2-Trichlorethane (1,1,2-TCA) with an example reaction time of 72 hours and a molar TCA to initiator ratio of about 1:1, all at a temperature of 115° C. It is re-emphasized that this example of a synthesis of the PIBOMA-SBR block-copolymer constitutes a non-limiting example using polymerization techniques known to the person skilled in the art.

In another non-limiting example, block-copolymers can be synthesized via anionic polymerization in which the first, elastomer block is synthesized out of the elastomer forming monomers in a first step and then the thermoplastic monomers are added in a second step so as to form the second, thermoplastic block of the diblock copolymer. For instance, butadiene is distilled under vacuum into a pressure stable glass reactor pre-cooled at −20° C. Further, the reactor is filled with an inert atmosphere up to 0.1 bar overpressure. A solution of tetraacetylethylenediamine (TMEDA) in cyclohexane is provided in a separate flask and degassed. This solution is injected into the reactor containing the butadiene under overpressure of the inert atmosphere (such as Ar) at −20° C. The reactor is then heated to about 55° C. and the solution is stirred at this temperature for about 20 minutes. A solution of n-BuLi in hexane is injected into the reactor at 55° C. resulting in the formation of poly(butadienyl)lithium (PBD-Li+). Once the injection of n-BuLi is complete, the temperature in the reactor is increased to 60° C. Polymerization of butadiene proceeds at 60° C. for about 1 h, whereupon the temperature is reduced to 45° C. The temperature is further decreased to 25° C. and 1,1-diphenylethylene (DPE) is injected in the reactor to end-cap polybutadiene anions. Stirring is continued for 15 minutes at 25° C. wherein the color of the solution changes from pale yellow to orange-red. Afterwards, the solution is cooled down to 0° C. and tetrahydrofuran (THF) is introduced into the reactor, changing the color of the solution to red. Finally, IBOMA is injected into the reactor at 0° C. such that the color of the solution disappears. The polymerization of IBOMA is proceeded for 1.5 hour at 0° C., whereupon the polymerization is quenched by injection of deoxygenated anhydrous methanol. The resulting block-copolymer can be purified by (double) precipitation into the excess of methanol and dried.

The inventors have synthetized a plurality of different block-copolymers comprising blocks with varying molecular weights, as well as different elastomer monomer units, and include those in rubber compositions such as shown in TABLE 1 below.

In particular, TABLE 1 shows two control samples of rubber compositions comprising a SSBR, a filler (here carbon black), oil, stearic acid, antioxidants, waxes, zinc oxide, sulfur and curing accelerators. Control Sample 1 comprises no thermoplastic polymer and is mainly reinforced by means of its carbon black filler, whereas Control Sample 2 (which is also not in accordance with the present invention) comprises 10 phr of polyethylene (PE) which is used for additional reinforcement of the rubber composition.

Each of the Inventive Examples 1 to 7 comprises a different type of a block-copolymer in accordance with an embodiment of the present invention. None of the Inventive Examples comprises PE. Carbon black, oil, stearic acid, antioxidants, waxes, zinc oxide, sulfur and accelerators, are included at the same weight level as in the Control Samples 1 and 2. Moreover, the Inventive Examples comprise the same type of SSBR as the Control Samples but in slightly varying amounts in view of the varying chain lengths of the elastomer blocks of the utilized block-copolymers. The composition of each of the block-copolymers 1 to 7 is indicated in the footnote of TABLE 1 below.

TABLE 1

| Material | Control | | Inventive Examples | | | | | | |
|---|---|---|---|---|---|---|---|---|---|
| | C 1 | C 2 | IE 1 | IE 2 | IE 3 | IE 4 | IE 5 | IE 6 | IE 7 |
| | | | | | [phr] | | | | |
| SSBR [a] | 100 | 100 | 90 | 92 | 94 | 97 | 71 | 81 | 88 |
| Block-Copolymer 1 [b] | 0 | 0 | 20 | 0 | 0 | 0 | 0 | 0 | 0 |
| Block-Copolymer 2 [c] | 0 | 0 | 0 | 18 | 0 | 0 | 0 | 0 | 0 |
| Block-Copolymer 3 [d] | 0 | 0 | 0 | 0 | 16 | 0 | 0 | 0 | 0 |
| Block-Copolymer 4 [e] | 0 | 0 | 0 | 0 | 0 | 13 | 0 | 0 | 0 |
| Block-Copolymer 5 [f] | 0 | 0 | 0 | 0 | 0 | 0 | 39 | 0 | 0 |
| Block-Copolymer 6 [g] | 0 | 0 | 0 | 0 | 0 | 0 | 0 | 29 | 0 |
| Block-Copolymer 7 [h] | 0 | 0 | 0 | 0 | 0 | 0 | 0 | 0 | 22 |
| PE [i] | 0 | 10 | 0 | 0 | 0 | 0 | 0 | 0 | 0 |
| Carbon Black | 50 | 50 | 50 | 50 | 50 | 50 | 50 | 50 | 50 |
| Oil [j] | 4 | 4 | 4 | 4 | 4 | 4 | 4 | 4 | 4 |
| Stearic Acid | 2 | 2 | 2 | 2 | 2 | 2 | 2 | 2 | 2 |
| Antioxidants [k] | 2.5 | 2.5 | 2.5 | 2.5 | 2.5 | 2.5 | 2.5 | 2.5 | 2.5 |
| Waxes | 1.5 | 1.5 | 1.5 | 1.5 | 1.5 | 1.5 | 1.5 | 1.5 | 1.5 |
| Zinc Oxide | 2.5 | 2.5 | 2.5 | 2.5 | 2.5 | 2.5 | 2.5 | 2.5 | 2.5 |
| Sulfur | 1.5 | 1.5 | 1.5 | 1.5 | 1.5 | 1.5 | 1.5 | 1.5 | 1.5 |
| Accelerators [l] | 2.3 | 2.3 | 2.3 | 2.3 | 2.3 | 2.3 | 2.3 | 2.3 | 2.3 |

[a] Sprintan™ SLR 3402-SCHKOPAU, Solution-styrene butadiene rubber, with a glass transition temperature of about −62° C.;
[b] Block-copolymer comprising a SSBR block with a Mn of 28700 g/mol and a PIBOMA block with a Mn of 26000 g/mol, wherein the PIBOMA block corresponds to 10 phr; SSBR microstructure: 20 weight % styrene, 17 weight % 1,2-butadiene, 63 weight % 1,4 butadiene; polydispersity 1.6;
[c] Block-copolymer comprising a SSBR block with a Mn of 26600 g/mol and a PIBOMA block with a Mn of 36700 g/mol, wherein the PIBOMA block corresponds to 10 phr; SSBR microstructure: 18.5 weight % styrene, 16.5 weight % 1,2-butadiene, 65 weight % 1,4 butadiene; polydispersity 1.5;
[d] Block-copolymer comprising a SSBR block with a Mn of 25900 g/mol and a PIBOMA block with a Mn of 46500 g/mol, wherein the PIBOMA block corresponds to 10 phr; SSBR microstructure: 15 weight % styrene, 17 weight % 1,2-butadiene, 68 weight % 1,4 butadiene; poly dispersity 1.5;
[e] Block-copolymer comprising a SSBR block with a Mn of 11800 g/mol and a PIBOMA block with a Mn of 40200 g/mol, wherein the PIBOMA block corresponds to 10 phr; SSBR microstructure: 15 weight % styrene, 15 weight % 1,2-butadiene, 70 weight % 1,4 butadiene; polydispersity 1.8;
[f] Block-copolymer comprising a BR block with a Mn of 78400 g/mol and a PIBOMA block with a Mn of 26800 g/mol, wherein the PIBOMA block corresponds to 10 phr; BR micro structure: 47 weight % 1,2-butadiene, 53 weight % 1,4 butadiene; polydispersity 1.25;
[g] Block-copolymer comprising a BR block with a Mn of 68500 g/mol and a PIBOMA block with a Mn of 36700 g/mol, wherein the PIBOMA block corresponds to 10 phr; BR micro structure: 52 weight % 1,2-butadiene, 48 weight % 1,4 butadiene; poly dispersity 1.16;
[h] Block-copolymer comprising a BR block with a Mn of 80230 g/mol and a PIBOMA block with a Mn of 66550 g/mol, wherein the PIBOMA block corresponds to 10 phr; BR micro structure: 51 weight % 1,2-butadiene, 49 weight % 1,4 butadiene; poly dispersity 1.33;
[i] Ultra-high molecular weight polyethylene with a number average molecular weight Mn of 4,700,000 g/mol as determined by Margolies' equation;
[j] TDAE oil;
[k] as Phenylene diamine;
[l] as Sulfenamides and diphenylguanidine TABLE 2 shows measured storage modulus (E') values for the compositions listed also in TABLE 1, wherein the storage modulus can be considered as a stiffness indicator or in other words as an indicator for the reinforcement effect of PE and the different block-copolymers in the above compositions.

Control Sample 2 which comprises the additional PE reinforcement shows increased stiffness values below about 100° C. At higher temperatures, the reinforcement of PE drops significantly and even below the values of the Control Sample 1 although Control Sample 2 comprises the same amount of carbon black as Control Sample 1. According to a non-binding theory of the inventors, this is mainly caused by the melting point of the PE material (at about 135° C.).

Turning to the Inventive Examples, all Inventive Examples show a significantly higher stiffness than Control Samples 1 and 2 at the measured temperatures 30° C., 50° C., and 100° C. Even at 150° C., the stiffness is higher for all Inventive Examples compared with the Control Sample 2. While Inventive Examples 1, 2, 3, 4 and 7 show also a higher storage modulus value at 150° C. in comparison with the Control Sample 1, the storage modulus values for Inventive Examples 5 and 6 are at least at a comparable level at the same temperature compared to Control Sample 1. However, in this context it is emphasized that the stiffness and reinforcement at lower temperatures is significantly higher for Inventive Examples 5 and 6 compared to the Control Sample 1.

TABLE 2

| Temperature | Control | | Inventive Examples | | | | | | |
|---|---|---|---|---|---|---|---|---|---|
| | C 1 | C 2 | IE 1 | IE 2 | IE 3 | IE 4 | IE 5 | IE 6 | IE 7 |
| | | | Storage Modulus E' [MPa]* | | | | | | |
| 30° C. | 11.7 | 12.1 | 19.2 | 19.1 | 17.0 | 14.3 | 14.2 | 16.4 | 21.4 |
| 50° C. | 10.4 | 10.9 | 16.3 | 16.3 | 14.7 | 12.5 | 12.3 | 14.1 | 18.1 |
| 100° C. | 9.3 | 9.2 | 12.3 | 13.3 | 12.9 | 10.5 | 9.9 | 11.0 | 14.3 |
| 150° C. | 9.3 | 7.9 | 10.2 | 12.6 | 12.5 | 9.8 | 8.7 | 9.1 | 12.4 |
| 180° C. | 9.1 | 7.7 | 8.5 | 11.3 | 11.6 | 9.0 | 7.8 | 7.8 | 10.3 |

*Dynamic Mechanical Thermal Analysis (DMTA) was performed in accordance with the ASTM D7028-07 standard. Measurements were carried out for cured (vulcanized) compounds on bars (length × width × thickness = 20 × 6 × 2 (mm)) with a DMA 242 C model (Netzsch, Germany) operating in tension mode (strain between 0.05 and 0.07%, pretension: 10-2N). Experiments were performed at 1 Hz frequency with a heating rate of 2° C./min from −180° C. to 180° C.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A rubber composition comprising:
   a rubber elastomer;
   a filler; and
   a block-copolymer comprising an elastomer block and a thermoplastic block comprising a poly alkylacrylate, wherein the poly alkylacrylate contains a single bonded oxygen atom, and wherein the alkylacrylate comprises a polycyclic substituent at the single bonded oxygen atom.

2. The rubber composition of claim 1 wherein at least one of the rubber elastomer and the elastomer block comprises at least one diene-based elastomer.

3. The rubber composition of claim 2 wherein the diene-based elastomer is selected from one or more of styrene butadiene rubber, polybutadiene, solution polymerized styrene butadiene rubber, emulsion polymerized styrene butadiene rubber, natural rubber, synthetic polyisoprene, and isoprene butadiene rubber.

4. The rubber composition of claim 1 wherein at least one of the rubber elastomer and the elastomer block has a functional group which is capable of coupling to one of silica and carbon black.

5. The rubber composition of claim 4 wherein the elastomer block comprises an elastomer chain having a first chain end and a second chain end, with the first chain end connected to the poly alkylacrylate block, and wherein the functional group is located at said second chain end.

6. The rubber composition of claim 1 wherein the poly alkylacrylate has the following structure:

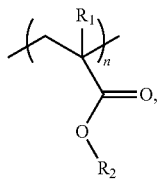

wherein n represents the number of the alkylacrylate monomers in the poly alkylacrylate, wherein $R_1$ represents the alkyl; and wherein $R_2$ represents a polycyclic hydrocarbon material.

7. The rubber composition of claim 6 wherein n is an integer being one or more of larger than 10 and smaller than 2000.

8. The rubber composition of claim 1 wherein the alkyl is one of —$CH_3$ and —$C_2H_5$.

9. The rubber composition of claim 1 wherein the alkylacrylate has at the single bonded oxygen atom one of:
i) a bicyclic substituent,
ii) a tricyclic substituent,
iii) a hydrocarbon substituent comprising at least seven carbon atoms, with at least five of the carbon atoms cyclically arranged.

10. The rubber composition of claim 1 wherein the poly alkylacrylate is one of: poly(isobornyl methacrylate) and poly(adamantyl methacrylate).

11. The rubber composition of claim 6 wherein the poly alkylacrylate comprises one or more of the following structures:

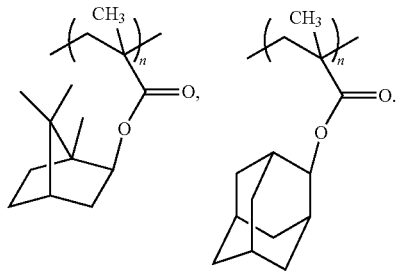

12. The rubber composition of claim 1 wherein the thermoplastic block consists of the poly alkylacrylate and has one or more of: (i) a number average molecular weight Mn of at least 10,000 g/mol and (ii) at least 10 alkylacrylate monomers.

13. The rubber composition of claim 1, wherein the thermoplastic block consists of the poly alkylacrylate and has one or more of: (i) a number average molecular weight Mn of at most 150,000 g/mol and (ii) at most 2000 alkylacrylate monomers.

14. The rubber composition of claim 1, wherein the elastomer block has one or more of: (i) a number average molecular weight Mn of at least 10,000 g/mol and (ii) at least 90 monomers chosen from a list of styrene, butadiene, and isoprene.

15. The rubber composition of claim 1, wherein the elastomer block has one or more of: (i) a number average molecular weight Mn of at most 450,000 g/mol and (ii) at most 6000 monomers chosen from a list of styrene, butadiene, and isoprene.

16. The rubber composition of claim 1, wherein the block-copolymer has a first glass transition temperature within a range of −92° C. to −15° C. and a second glass transition temperature within a range of 150° C. to 250° C.

17. The rubber composition of claim 1, wherein a ratio of (i) a number average molecular weight Mn of the elastomer block and (ii) a number average molecular weight Mn of the thermoplastic block is within a range of 0.1 to 0.95.

18. The rubber composition of claim 1 comprising:
50 phr to 90 phr of the elastomer;
10 phr to 50 phr of the block-copolymer;
20 phr to 200 phr of the filler comprising one or more of: at least one silica and at least one carbon black.

19. An article of manufacture selected from a tire, a power transmission belt, a hose, a track, an air sleeve, and a conveyor belt, wherein the article of manufacture comprises the rubber composition of claim 1.

20. A block-copolymer comprising
an elastomer block, and
a thermoplastic block comprising a poly alkylacrylate, wherein the poly alkylacrylate contains a single bonded oxygen atom, and wherein the alkylacrylate comprises a polycyclic substituent at the single bonded oxygen atom, and wherein the block-copolymer is a diblock copolymer.

* * * * *